United States Patent
Chalamala et al.

(10) Patent No.: US 10,354,355 B2
(45) Date of Patent: Jul. 16, 2019

(54) DIGITAL WATERMARKING

(71) Applicant: TATA CONSULTANCY SERVICES LIMITED, Mumbai (IN)

(72) Inventors: Srinivasa Rao Chalamala, Hyderabad (IN); Krishna Rao Kakkirala, Hyderabad (IN); Bala Mallikarjunarao Garlapati, Hyderabad (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 285 days.

(21) Appl. No.: 14/498,726

(22) Filed: Sep. 26, 2014

(65) Prior Publication Data
US 2016/0035058 A1 Feb. 4, 2016

(30) Foreign Application Priority Data

Jul. 29, 2014 (IN) .......................... 2443/MUM/2014

(51) Int. Cl.
*G06T 1/00* (2006.01)

(52) U.S. Cl.
CPC ...... *G06T 1/005* (2013.01); *G06T 2201/0051* (2013.01); *G06T 2201/0061* (2013.01); *G06T 2201/0065* (2013.01); *G06T 2201/0083* (2013.01)

(58) Field of Classification Search
CPC ............. G06T 1/005; G06T 2201/0051; G06T 2201/0061; G06T 2201/0065; G06T 2201/0083
See application file for complete search history.

(56) References Cited

U.S. PATENT DOCUMENTS

| 6,580,804 | B1* | 6/2003 | Abe ...................... | G06T 1/0028 382/100 |
| 2003/0172274 | A1* | 9/2003 | Hsia ........................ | G06T 1/005 713/176 |
| 2004/0141630 | A1* | 7/2004 | Bhaskaran ............ | G06T 1/0021 382/100 |
| 2010/0098287 | A1* | 4/2010 | Xuan ..................... | G06T 1/0028 382/100 |
| 2010/0177891 | A1* | 7/2010 | Keidar ................... | H04N 5/913 380/200 |

(Continued)

OTHER PUBLICATIONS

Wang et al., "A majority-voting based watermarking scheme for color image tamper detection and recovery", 2007, Computer Standards & Interfaces, vol. 29, 561-570.*

(Continued)

*Primary Examiner* — Katrina R Fujita
(74) *Attorney, Agent, or Firm* — Seed IP Law Group LLP

(57) ABSTRACT

System(s) and method(s) for embedding and extracting a watermark from a digital media are described. The method may include embedding a set of watermark bits in a N*N block of the digital media based on a local binary pattern (LBP) synthesis process. The LBP synthesis process comprises changing a value of a neighbor of a central pixel of the N*N block to make the value of the neighbor greater than a value of the central pixel when a watermark bit corresponding to the neighbor is '1' and changing the value of the neighbor of the central pixel to make the value of the neighbor lesser than the value of the central pixel when the watermark bit corresponding to the neighbor is '0'.

8 Claims, 4 Drawing Sheets

(56) References Cited

U.S. PATENT DOCUMENTS

| | | | | |
|---|---|---|---|---|
| 2010/0220928 A1* | 9/2010 | Iwabuchi | ............. | G06K 9/4642 |
| | | | | 382/190 |
| 2011/0228971 A1* | 9/2011 | Webb | ................. | H04N 1/32187 |
| | | | | 382/100 |
| 2013/0022099 A1* | 1/2013 | Liu | ........................ | H04N 19/46 |
| | | | | 375/240.01 |
| 2013/0170696 A1* | 7/2013 | Zhu | .......................... | G06K 9/68 |
| | | | | 382/103 |
| 2015/0043785 A1* | 2/2015 | Muninder | .......... | G06K 9/00261 |
| | | | | 382/107 |

OTHER PUBLICATIONS

Varsaki et al. "A Data Hiding Scheme Based on LBPROT Pattern." Hellenic Open University Journal of Informatics 3.1 (2011).*

Otori et al. "Texture synthesis for mobile data communications." IEEE Computer graphics and applications 29.6 (2009): (Year: 2009) 74-81.*

Varsaki et al. "Data hiding based on image texture classification." Signal, image and video processing 7.2 (2013): 247-253. (Year: 2013).*

Chang et al., "LBP-Based Fragile Watermarking Scheme for Image Tamper Detection and Recovery," IEEE 2nd International Symposium on Next-Generation Electronics (ISNE), Feb. 25-26, 2013, Kaohsiung, Taiwan, 4 pages.

Wenyin et al., "Semi-Fragile Spatial Watermarking Based on Local Binary Pattern Operators," Optics Communications 284:3904-3912, 2011.

* cited by examiner

|     |     |     |
| --- | --- | --- |
| 250 | 190 | 195 |
| 201 | 200 | 210 |
| 255 | 5   | 199 |

FIG. 2A

| B0 | B1 | B2 | B3 | B4 | B5 | B6 | B7 |
| --- | --- | --- | --- | --- | --- | --- | --- |
| 1  | 1  | 0  | 1  | 0  | 0  | 1  | 1  |

FIG. 2B

|      |     |     |     |      |
| ---- | --- | --- | --- | ---- |
|      |     | B2  |     |      |
| B1   | 250 | 190 | 195 | B3   |
| B0   | 201 | 200 | 210 | B4   |
| B7   | 255 | 5   | 199 | B5   |
|      |     | B6  |     |      |

FIG. 2C

DIGITAL WATERMARKING

TECHNICAL FIELD

The present subject matter relates, in general, to digital watermarking and, in particular, to digital watermarking based on local binary pattern.

BACKGROUND

Development of technology has facilitated easy copying and transmission of digital media (audio, video, images, etc.) due to which digital media can be easily manipulated, distributed, and rendered (played) by devices, such as video players and computers, and is easily transmitted over computer networks. Due to digital media being pervasive and easily manipulated, illegal activities, such as digital piracy involving unauthorized distribution, duplication and modification are becoming increasingly prevalent. Consequently, techniques to protect owner's right of the digital media are in demand.

Digital watermarking provides copyright protection, authentication, and content tracking information. Digital watermarking may be used to embed copyright information into digital media to protect owner's right. For example, the copyright information may be embedded to protect the digital media from illegal copying and to identify manipulations in digital media. Watermarks are intended to be imperceptible to the end user of the digital media. A watermark is embedded using an algorithm and is perceptible to watermark-reading software only. Due to these widespread advantages, digital watermarking is utilized in a gamut of applications, such as image and audio protection, and video piracy preservation.

Digitally watermarked digital media may often undergo modifications. The modifications may be due to alterations done to the digital media or due to illegal distribution, copyright violation, etc. of the digital media. These modifications are commonly called as "attacks" and they degrade the quality of the watermark embedded in the media and render watermark's detection more difficult. Attacks are generally classified into unintentional and intentional attacks, wherein the intentional attacks are made during attempts to misuse or illegally distribute the digital media, undertaken by pirates. Intentional attacks generally have the objective to render the detection of watermark difficult. Unintentional attacks can be scaling, cropping, compressing, etc., of the digital media without any malicious intent of the doer. It is desirable that a watermark remains embedded in digital media, even if the digital media is subjected to such varied and different attacks.

SUMMARY

This summary is provided to introduce concepts related to embedding and extracting a watermark from a digital media, which is further described below in the detailed description. This summary is not intended to identify essential features of the claimed subject matter nor is it intended for use in determining or limiting the scope of the claimed subject matter.

In one embodiment of the present subject matter, method(s) and system(s) for embedding and extracting a watermark from a digital media are described. The method for embedding a watermark in a digital media may include dividing the digital media into a plurality of groups of N*N blocks wherein a set of watermark bits may be embedded into one or more N*N blocks of the group. In an example implementation, the method includes embedding the set of watermark bits in the N*N block of the digital media based on a local binary pattern (LBP) synthesis process. The LBP synthesis process comprises changing a value of a neighbor of a central pixel of the N*N block to make the value of the neighbor greater than a value of the central pixel when the watermark bit corresponding to the neighbor is '1' and changing the value of the neighbor of the central pixel to make the value of the neighbor lesser than the value of the central pixel when the watermark bit corresponding to the neighbor is '0'.

In another embodiment of the present subject matter, method for extracting the watermark from a watermarked digital media is described. The method may include dividing the digital media into a plurality of groups of N*N blocks alike the division done for embedding the watermark. The method further comprises computing a local binary pattern of each of the N*N blocks in a group using a forward LBP process. Further, the method comprises determining the local binary pattern that occurs most frequently in the group. The local binary pattern that occurs most frequently in the group corresponds to the set of watermark bits inserted in the N*N blocks of the group and may be extracted for further processing.

BRIEF DESCRIPTION OF DRAWING

The detailed description is described with reference to the accompanying figures. In the figures, the left-most digit(s) of a reference number identifies the figure in which the reference number first appears. The same numbers are used throughout the drawings to reference like features and components.

FIGS. 2A, 2B, and 2C illustrate an example of the LBP synthesis process, in accordance with an embodiment of the present subject matter.

DETAILED DESCRIPTION

Figure 1:
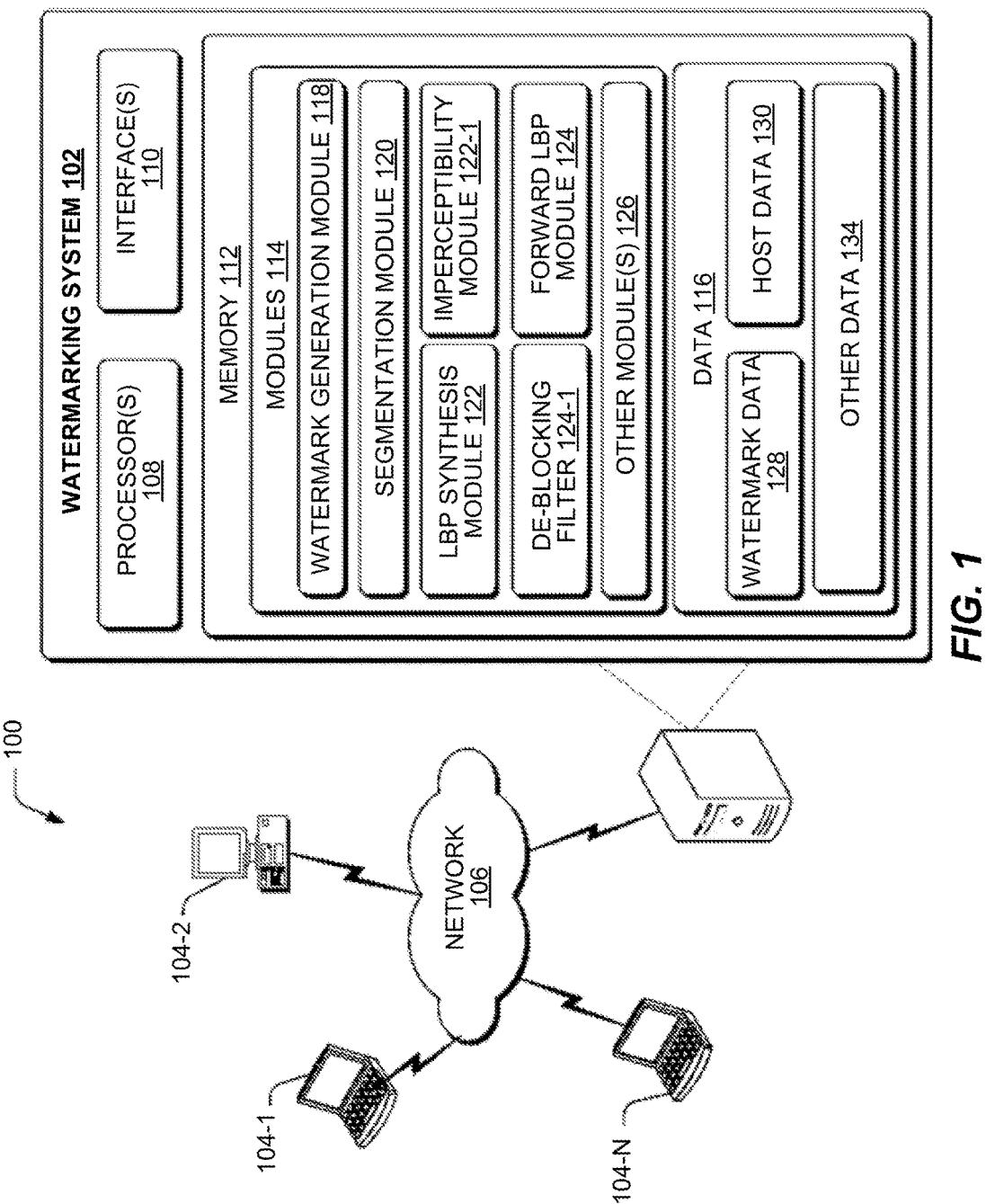
FIG. 1 illustrates a network environment for implementing a watermarking system, in accordance with an embodiment of the present subject matter.

Digital watermarking is a technique of embedding watermark in the digital media. Digital watermarking allows users to legally use the digital media, while adding security to the digital media to prevent illegal usage. As would be understood by those skilled in the art, the term 'digital media' as used herein includes video, image, audio, and multimedia media. Further, the term 'watermark' will be understood to include symbols, image, data, instruction, and other information for identifying owner of the digital media.

Generally, there are three main processes involved in the digital watermarking, namely, insertion (embedding) of watermark, detection of watermark and removal (extraction) of watermark. For the purpose of providing efficient copyright protection, digital watermarking technique should meet the criteria of imperceptibility and robustness against attacks. However, while designing robust watermark, computational complexity of the watermark extraction should be considered. It is desirable that the process of embedding and extracting the watermark be computationally light, i.e., the time and resources of a computing system implementing the process of embedding and extracting the watermark should be optimum. For example, a watermarking algorithm should be such that it does not consume a significant amount of computational time to embed or extract the watermark.

Various robust video watermarking methods have been proposed to solve the illegal copying and, to validate proof of ownerships as well as to identify manipulations. However, these methods are not precise to extract the watermark under attacks, such as rotation, cropping, or scaling. Additionally, techniques providing robust video watermarking have such computational overheads that these methods take long durations to find the pirate of digital media among several people to whom the digital media is distributed, resulting in limitation to usefulness of digital watermarking. For example, conventionally known techniques typically involve performing Fourier transformations for conversion of the digital media between time/frequency domains. Such conversions are complex and consume time as well as computation resources.

Accordingly, the present subject matter discloses systems and methods for digital watermarking. In an example implementation, a system and method for embedding and extracting watermark from digital media that is robust and computationally light is described. The systems and methods provide for embedding a watermark in a digital media in a manner that requires significantly less time and computational resources. In one implementation, the described systems and methods also provide for techniques to reduce computation time required for an error free identification and extraction of a watermark from a watermarked digital media.

In one implementation of the present subject matter, a digital media to be watermarked is segmented in to multiple groups of N*N blocks. Each group may include a set of block from one or more rows or columns of N*N blocks of the digital media. In one example, a group of N*N blocks may be formed by selecting a set of blocks from amongst the rows or columns of the digital media in a predetermined order. The watermark to be embedded in the digital media is converted in to a string comprising multiple bits. In one example, the same set of bits of the watermark, also referred herein as a watermark bits, may be embedded into one or more N*N blocks of a given group. In an example implementation, a local binary pattern (LBP) synthesis process is employed to insert the watermark bits into the N*N blocks.

In one embodiment, the watermark bits are embedded in only those blocks whose variance is in a predefined threshold range. This is to ensure imperceptibility of the watermark. In case the variance of a block of a digital media is high, it indicates that the values of the pixels in the block are far spread out. In one example implementation, embedding of watermark bits in such blocks is avoided to keep the watermark imperceptible.

The LBP synthesis process comprises changing a value of a neighbor of a central pixel of the N*N block to make the value of the neighbor pixel greater than a value of the central pixel when a watermark bit corresponding to the neighbor, i.e., the watermark bit to be embedded is '1'. Similarly, the value of the neighbor of the central pixel of the N*N block is changed to make the value of the neighbor lesser than the value of the central pixel when the watermark bit corresponding to the neighbor is '0'. For the purpose, each of the neighbors of the central pixel in the N*N blocks that may correspond to the different bits of the watermark may be predetermined.

Thus, the entire watermark that has been converted into the string of bits is embedded in the digital media by repeating the above described process to embed different sets of watermark bits into one or more groups of N*N blocks of the digital media, where each group may include a set of blocks from one or more rows or columns of the digital media.

In an example, (N*N−(N−2)*(N−2)) watermark bits may be inserted in a N*N block. For example, a set of watermark bits that may be in multiples of 8, i.e., in byte form having a size less than (N*N−(N−2)*(N−2)) bits may be inserted in a block having N*N size. Accordingly, in embodiments where only outer contour pixels are used for inserting the watermark bits, a watermark byte may be inserted in a 3*3 block and similarly, a 16-bit watermark word may be inserted in a 5*5 block. The outer contour pixels may be understood as the pixels that are at the periphery or boundary of the N*N block and are at the same radial distance from the central pixel of the N*N block. In other embodiments, based on the imperceptibility, it may also be possible to insert (N*N−1) watermark bits in a N*N block by using all the contours in the N*N block. To explain, pixels at the same radial distance from the central pixel of the N*N block may be considered to form a contour. Accordingly, in an example, 24-bits of a watermark may be inserted in a 5*5 block, for example, by using the 16 outer contour pixels as well as the 8 pixels that are immediate neighbor of the central pixel in the inner contour of the 5*5 block.

In one example implementation, the digital media is segregated based on the number of watermark bits that have to be accommodated in the different groups of N*N blocks of the digital media. For example, if the watermark is composed of 64 bytes, the embedding process may be such that the first watermark byte is embedded in the first group of 3×3 blocks, the second watermark byte is embedded in the second group of 3×3 blocks and so on. As evident, in the present example, the digital media should be segregated into at least 64 groups wherein each group comprises a plurality of rows or columns of the digital media.

In one example implementation, after the LBP synthesis process is performed to embed all the watermark bits in the different group of block of the digital media, de-blocking filtration is performed to remove any distortions that may have occurred at the boundaries of the watermarked blocks of the digital media due to embedding the watermark bits.

In one implementation, the extraction of the watermark involves segmenting the watermarked digital media into to multiple groups of N*N blocks in accordance with the segmentation done during embedding the watermark. Further, for each of the N*N blocks in a given group, a forward LBP process is carried out to determine the local binary pattern of the block, which can be 8-bit or 16-bit or any other predetermined size. In one example, for the given group, a histogram is formed based on the values of the local binary patterns. The local binary pattern that occurs most frequently in each group of blocks corresponds to the set of bits of the watermark embedded in the blocks of the group. Accordingly, the different sets of watermark bits embedded in the plurality of groups are identified and extracted to complete the extraction process.

Thus, the present subject matter discloses systems and methods for embedding and extracting a watermark from a digital media based on computationally light techniques that eliminate the need for complex computations, such as Fourier transformations. The methods and systems of the present subject matter use pixel values without any transformations and may be carried out by simple computer instructions, such as addition, subtraction, and comparison.

Although, it is possible that the watermark to be embedded in the digital media may be converted into binary, hexadecimal, octal, or any other representation, the description henceforth has been explained based on watermarks that are converted into strings of bytes. As known to one skilled in the art, a byte of the watermark may comprise eight bits that may have any combination of '0' and '1'.

Also in various implementations, the digital media may be segmented in different ways. For example, in an implementation where the digital media is a video, the digital media may be segmented into multiple frames and each frame may be further segmented into multiple subframes, where the multiple groups of the N*N block may exist. The group could be set of blocks in a row or a column or ordered in some random fashion. In another implementation, where the digital media is an image, the entire image or a portion thereof may be segmented into the multiple rows or columns. For the ease of understanding, the digital media segmented according to embodiments described herein may be considered to be an image segmented into M rows, each having K number of the N*N blocks.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventors) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

While aspects of described systems and methods for digital watermarking can be implemented in any number of different computing devices, environments, and/or configurations, the embodiments are described in the context of the following exemplary system(s).

FIG. 1 illustrates a network environment 100 implementing a watermarking system 102, according to an embodiment of the present subject matter. The network environment 100, apart from the watermarking system 102, includes one or more client devices 104-1, 104-2, . . . , 104-N. For the purpose of explanation and clarity, the client devices 104-1, 104-2, . . . , 104-N, are hereinafter collectively referred to as client devices 104 and hereinafter individually referred to client device 104. In the network environment 100, the watermarking system 102 is connected to the client devices 104 through a network 106.

The network 106 may be a wireless network, wired network, or a combination thereof. The network 106 can be implemented as one of the different types of networks, such as intranet, telecom network, electrical network, local area network (LAN), wide area network (WAN), Virtual Private Network (VPN), internetwork, Global Area Network (GAN), the Internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include a variety of network devices, including routers, bridges, servers, computing devices, storage devices.

The watermarking system 102 and the client devices 104 can be implemented as any of a variety of conventional computing devices including, for example, servers, a desktop PC, a notebook or a portable computer, a workstation, a mainframe computer, a mobile computing device, an entertainment device, and an Internet appliance. Although the watermarking system 102 and the client devices 104 are shown to be connected through a physical network 106, it would be appreciated by those skilled in the art that the watermarking system 102 and the client devices 104 may be distributed locally or across one or more geographic locations and can be physically or logically connected to each other.

The watermarking system 102 may be coupled to the client devices 104 for various purposes. For example the watermarking system 102 may be connected to a client device 104 to receive a digital media in order to watermark the received digital media and distribute the watermarked digital media to one or more other client devices 104. In accordance with one embodiment of the present subject matter, the watermarking system 102 implements a LBP synthesis process for embedding the watermark and a forward LBP process for extracting the watermark. The implementation and functioning of the watermarking system 102 to embed and extract the watermark is as described below.

In one implementation, the watermarking system 102 includes one or more processor(s) 108, interface(s) 110, and a memory 112, coupled to the processor(s) 108. The processor(s) 108 can be a single processing unit or a number of units, all of which could include multiple computing units. The processor(s) 108 may be implemented as one or more microprocessors, microcomputers, microcontrollers, digital signal processors, central processing units, state machines, logic circuitries, and/or any devices that manipulate signals based on operational instructions. Among other capabilities, the processor(s) 108 is configured to fetch and execute computer-readable instructions and data stored in the memory 112.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional, and/or custom, may also be included.

The interface(s) 110 may include a variety of software and hardware interfaces, for example, interfaces for peripheral device(s), such as a keyboard, a mouse, an external memory, and a printer. The interface(s) 110 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 110 may include one or more ports for connecting the watermarking system 102 to a number of client devices 104. In various example implementations discussed below, the watermarking system 102 communicates with the client devices 104 via the interfaces 110.

The memory 112 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 also includes modules 114 and data 116.

The modules 114, amongst other things, include routines, programs, objects, components, data structures, etc., which perform particular tasks or implement particular abstract data types. The modules 114, includes a watermark generation module 118, a segmentation module 120, a LBP synthesis module 122, an imperceptibility module 122-1, a forward LBP module 124, a de-blocking filter 124-1 and other module(s) 126. The other module(s) 126 may include programs or coded instructions that supplement applications and functions of the watermarking system 102.

On the other hand, the data 116, inter alia serves as a repository for storing data processed, received, and generated by one or more of the modules 114. The data 116 includes, for example, watermark data 128, host data 130, and other data 134. The other data 134 includes data generated as a result of the execution of one or more modules in the other module(s) 126.

In one implementation, the watermarking system 102 performs embedding and extraction of a watermark from a digital media such that the embedding and extraction of watermark is computationally light. Further, the watermark is robust to the modifications/alterations, such as compression, and rotation, and so on made to the watermarked digital media. For the sake of ease of explanation of the process of embedding and extracting the watermark, reference is made herein to the example illustrated in FIG. 2. The example recited herein is intended expressly to be only for aiding the reader in understanding the principles of the invention and are not to be construed a limitation.

In operation, according to an implementation of the present subject matter, a watermark to be embedded in a digital media is obtained. In one example, the watermark may be a text, an image, or a unique binary message associated with the owner of the watermark. For instance, the watermark may be provide information regarding the owner and may include name, address, account number, photograph, and the like of the owner. In various examples, the watermark may be a product serial number, a company's logo, and so on. In an implementation, the watermarking system 102 may receive the watermark from a user through a client device 104. In an example, the user may be the owner of a digital media, such as a digital photograph who may wish to embed his signature in the digital photograph. In one implementation, the watermarking system 102 may store the received watermark as the watermark data 128 within the data 116 of the watermarking system 102.

In one implementation, the watermark generation module 118 is configured to covert the watermark into a series of bits. In an example, the watermark may be a text, audio, video, or image and the watermark generation module 118 may employ conventionally known algorithms to convert the same into a binary form consisting of a sequence of '0' or '1' bits. For example, set of a watermark bits may be a byte comprises 8 consecutive bits or a word comprising 16 consecutive bits of the sequence where a bit can be '0' or '1'.

In a similar manner, the watermarking system 102 may also receive the digital media to be watermarked. Referring to the previous example, the user who may be the owner of a digital media, such as the digital photograph who may wish to embed his signature in the digital photograph and may provide the digital photograph to the watermarking system 102. In one example implementation, the user may upload the digital photograph on the watermarking system 102 through a client device 104. In an implementation, the received digital media may be saved as host data 130 within the data 116 of the watermarking system 102.

In accordance with one embodiment of the present subject matter, the digital media is segmented into multiple non-overlapping blocks of size N*N. In one implementation, the segmentation module 120 of the watermarking system 102 is configured to segment digital media based on different techniques. For example, a given image could be segmented into M rows of N*N blocks. A fixed number of the N*N blocks are used for watermarking, if the number is large the extraction would be more robust, but very few bits can be embedded and vice-versa.

In an example, a watermark converted into a series of bytes is embedded in the segmented digital media such that each byte is embedded in K number of N*N blocks where K=W/N, W being the width of the image in pixels. In the present example, K is the number of the N*N blocks in each of the M rows and the same watermark byte is embedded into each of these K blocks. In the present example, the total number of blocks required for adding Q number of watermark bits would be K*Q/8, such that an entire row of K number of N*N blocks contains one byte of the watermark.

Thus, in an example, if a watermark is composed of 16 bits and the embedding process is such that a byte (8 bits) of the watermark is to be embedded in a group comprising N*N blocks of the digital media, the digital media should be segregated into at least 2 groups each comprising N*N blocks. Thus, in the present example, if W, i.e., the width of the image in pixels is 30 pixels and N is 3, there will be 10 number of 3*3 blocks in each group of the digital media and 2 groups of such 3*3 blocks, i.e., 20 such 3*3 blocks in which the 2 watermark bytes may be embedded.

A LBP synthesis process is used to embed a set of watermark bits, for example, a watermark byte in a N*N block of the digital media. In one example implementation, the LBP synthesis module 122 embeds the set of watermark bits in the respective N*N blocks of the digital media based on the LBP synthesis process. To explain the LBP synthesis process of embedding the watermark bits in a N*N block, reference is made to FIGS. 2A, 2B, and 2C. In the illustrated example, a 3*3 block is considered as an example to describe the embedding process, wherein a watermark byte comprising 8 watermark bits are embedded in the 3*3 block. It would be understood that the illustrated example is only for purposes of explanation and is not to be considered as a limitation. In various other examples, the size of the block and the number of watermark bits could be varied. For instance, a 16-bit word of watermark can be embedded into 5*5 blocks.

Referring to FIG. 2A, a 3*3 block of digital media having 9 pixels, with one central pixel and 8 neighbor pixels, is considered where each pixel has an associated pixel value as illustrated. FIG. 2B illustrates a watermark byte to be embedded in the 3*3 block of digital media illustrated in FIG. 2B, in accordance with in example of the present subject matter. The watermark byte comprises 8 bits B0, B1, B2, . . . , B7, wherein B0 is the most significant bit (MSB) and B7 is the least significant bit (LSB). To embed the watermark byte in the 3*3 block, according to one embodiment of the present subject matter, each of the bits of the watermark byte is considered to correspond to a neighbor of the central pixel of the 3*3 block. As seen from the example illustrated in FIG. 2C, the MSB bit B0 corresponds to the neighbor on the left of the central pixel, the MSB-1 bit B1 corresponds to the neighbor in the top left corner of the 3*3 block and so on.

In an example, the LBP synthesis module 122 determines neighbors of the central pixel in a N*N block that correspond to a most significant bit (MSB), MSB-1 and . . . MSB-7 bit positions of the watermark byte. In an example, the neighbor of the central pixel corresponding to the MSB bit is identified first and neighbors corresponding to the MSB-1, MSB-2, . . . , MSB-7 positions may be determined by traversing in a predetermined manner. In one example, the traversing may be done in either a clockwise direction, a counter-clockwise direction or in a zig-zag fashion to move from one neighbor of the central pixel to another neighbor.

In the present example, the neighbor on the left of the central pixel corresponding to the MSB is considered first. The value of the neighbor pixel on the left is compared to the value of the central pixel taking into consideration the watermark bit corresponding to the neighbor pixel on the left. The LBP synthesis process involves making the value of a neighbor pixel more than that of the central pixel if a bit in the watermark byte corresponding to the neighbor pixel is '1'. Similarly, the value of the neighbor pixel is made lesser than the value of the central pixel when the bit in the watermark byte corresponding to the neighbor is '0'.

Accordingly, in the present example, for the B0 bit of the watermark byte, since the value of the neighbor pixel on the left, corresponding to the B0 bit, is greater than the value of the central pixel, the value of the neighbor pixel is not altered. Similarly, the value of the neighbor pixels corresponding to B1 bit is also not altered since its pixel value is greater than the value of the central pixel and the watermark bit corresponding to the neighbor pixel on the left is '1'. The value of the neighbor pixel corresponding to B2 bit is less than the value of the central pixel. However, the since B2 bit is '0' the pixel value of the neighbor pixel is not changed. The value of the neighbor pixel at top right corner, corresponding to B3 bit, is less than the value of the central pixel. However, the since B3 bit is '1'. Accordingly, the pixel value of the neighbor pixel is changed such that the value of the neighbor pixel at top right corner is made greater than the value of the central pixel. Referring to the illustrated example, the value of the neighbor pixel at top right corner is 195 which is less than the value of the central pixel 200. In the present case, an offset of 6 is added to make the value of the neighbor pixel more than 200. Accordingly, all neighbor pixels are covered and their values are either changed or left unaltered to embed the watermark byte in the block. In one example, the above described LBP synthesis process may be represented as: ((Img(i,j)>=Img(2,2))&&) wmbit==0) then Img(i,j)=Img(2,2)-Alpha. If ((Img(i,j) <Img(2,2))&&)wmbit==1) then Img(i,j)=Img(2,2)+Alpha; wherein, Alpha is the offset as described above.

As explained previously, the same byte is embedded in K number of the N*N blocks of a row while other watermark bytes may be inserted in different rows of the digital media. In an implementation, to ensure imperceptibility of the watermark, the watermark bits are embedded in only those blocks which whose variance lies in a predefined threshold range T1-T2. In one example, T1 may be zero while the T2 may be the upper threshold defined based on the imperceptibility requirement of a digital media to be watermarked. Accordingly, the imperceptibility module 122-1 computes the variance of a block in which the watermark bits are to be embedded. In case the variance exceeds the predefined threshold T1, the LBP synthesis module 122 skips the block.

In an implementation, the LBP synthesis process explained above is repeated multiple times to insert the respective byte in the blocks of the different row until the entire watermark is embedded in the digital media. The digital media with the watermark embedded in it is referred to as watermarked digital media. Further, in one implementation, after the LBP synthesis process is carried out, some of the blocks in which the watermark bits are inserted may undergo distortion at their boundaries. The watermarking system 102 includes a de-blocking filter 124-1 to remove such distortions from the watermarked digital media.

The watermarked digital media may be copied, or illegally used by a pirate who may have subjected the watermarked digital media to different attacks or operations, such as compression, rotation, and so on. As a result of such actions, the watermark embedded to the watermarked digital media may be altered or modified. Therefore, to identify an illegally distributed or copied digital media, the watermarks embedded to the watermarked digital media that has been subjected to attack are extracted. In one implementation, based on the extracted watermark, the watermarked digital media may be authenticated. In situations where the extracted watermarked is different from the watermark embedded in the digital media, a pirate may be identified.

According to one example implementation of the present subject matter, the watermark is extracted based on a forward LBP process. In one implementation, the forward LBP module 124 of the watermarking system 102 extracts the embedded watermark from the watermarked digital media. The forward LBP process as mentioned herein, is in the art known to capture texture information in images, for example, in image segmentation, content based image retrieval and biometrics. In forward LBP process, a local spatial neighborhood in a portion of the digital media is thresholded at the gray value of the center pixel.

In operation, the forward LBP module 124 computes the local binary pattern of each of the N*N blocks in a group of the watermarked digital media. For the purpose, the watermarked digital media is segregated in a manner similar to the segregation done to embed the watermark in the watermarked digital media. Referring to the example discussed in FIG. 2A-C, the watermarked digital media is segregated into M rows of N*N blocks. To compute the local binary pattern of a N*N block, the value of central pixel in the block is considered. The value of central pixel is compared to the value of each of the neighbors. If the value of a neighbor pixel is greater than the value of the central pixel, a bit '1' is assigned, else bit '0' is assigned. In one example, the comparison is done starting with the neighbor pixel that corresponds to the MSB bit of the watermark bits and ending with the neighbor pixel that corresponds to the LSB bit of the watermark bits, wherein the neighbor pixels are traversed in a predetermined direction as chosen during the embedding process, for example i.e., either clockwise, counter-clockwise direction, zig-zag fashion. The string of bits assigned upon comparison with each of the neighbor forms the local binary pattern of the given N*N block.

Upon computing the local binary pattern for each of the N*N blocks in a given row, the forward LBP module 124 determines a local binary pattern that occurs most frequently in the row. In one embodiment, a histogram mapping the local binary pattern of each of the N*N blocks in the row against a number of times of occurrence of a local binary pattern in the blocks of the row may be made to determined the local binary pattern that occurs most frequently in that row. The local binary pattern that occurs most frequently in the row corresponds to the watermark bits inserted in the row. In an example, the extracted most frequent local binary pattern may be converted into its decimal representation to extract the embedded watermark byte. For example, an extracted byte of the watermark '11010011' is converted to its decimal form '211' which is the embedded watermark. The watermarking forward LBP module 124 is configured to extract the local binary pattern that occurs most frequently in a group. Accordingly, the forward LBP module 124 scans the watermarked digital media group by group to extract the entire the watermark embedded in the watermarked digital media.

Figure 3:
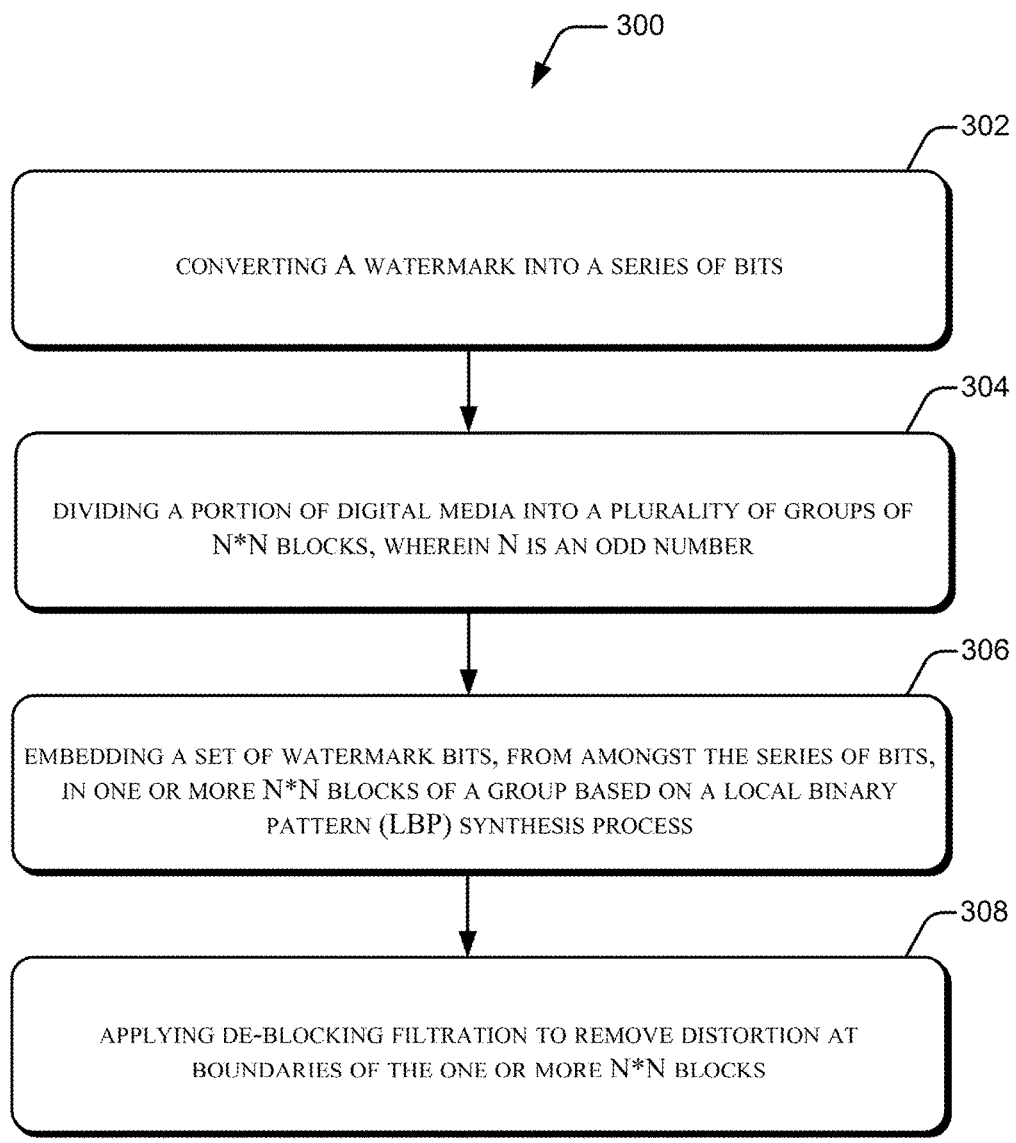
FIG. 3 illustrates a method for embedding a watermark in a digital media, in accordance with an implementation of the present subject matter.
Figure 4:
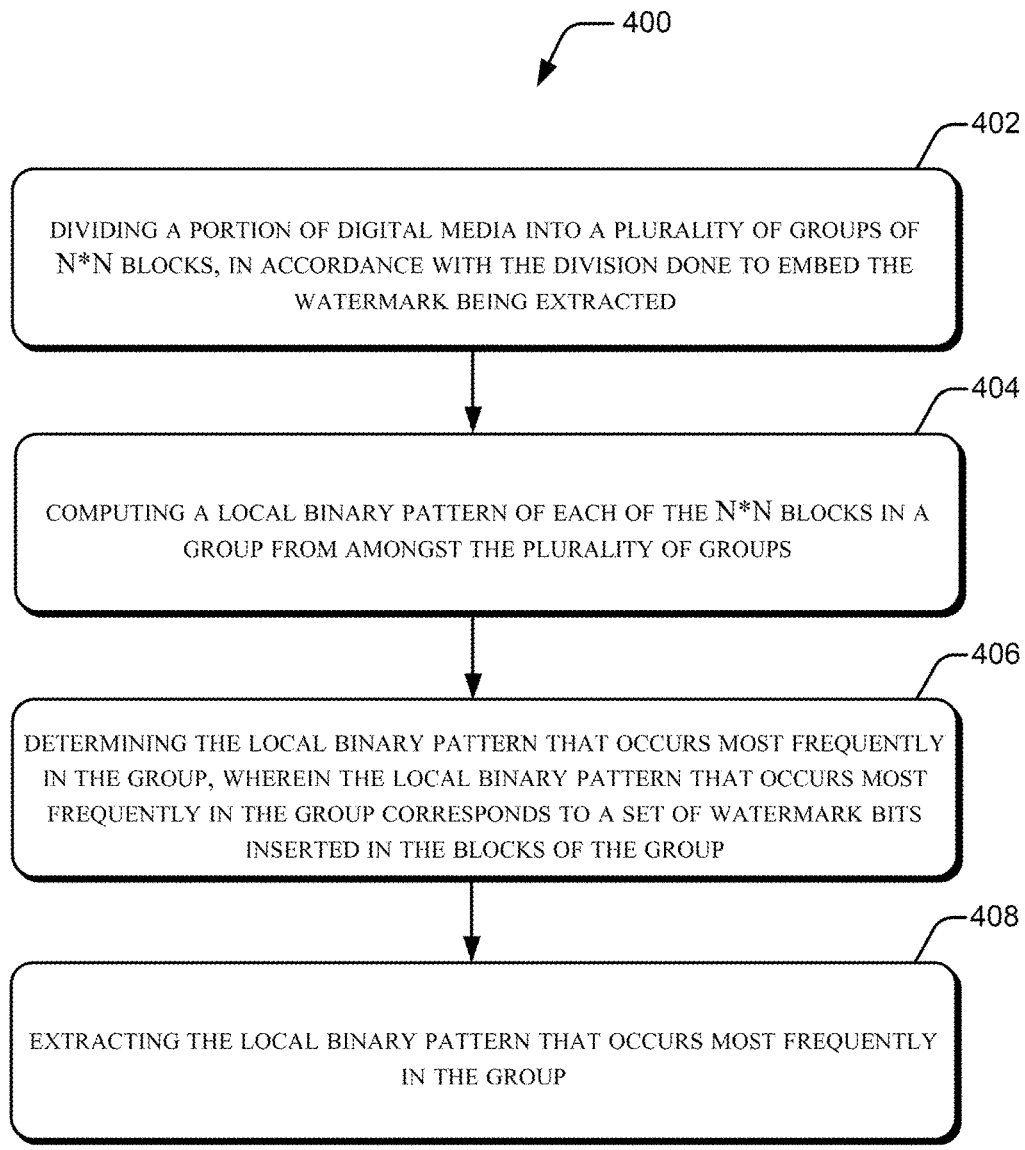
FIG. 4 illustrates a method for extracting a watermark from a watermarked digital media, in accordance with an implementation of the present subject matter.

FIGS. 3 and 4 illustrate methods 300 and 400 for embedding and extracting a watermark from a digital media, respectively, in accordance with an embodiment of the present subject matter. Although the methods 300 and 400 can be implemented in any computing devices, in the following description, the methods 300 and 400 are described in context of the watermarking system 102 described above.

The methods may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices, CDROM, DVD, BLURAY, flash drives, hard disks, tapes, and private networks.

The order in which the methods are described is not intended to be construed as a limitation, and any number of the described method blocks can be combined in any order to implement the methods 300 and 400, or an alternative method. Additionally, individual blocks may be deleted from the methods without departing from the spirit and scope of the subject matter described herein. Furthermore, the methods 300 and 400 can be implemented in any suitable hardware, software, firmware, or combination thereof. The methods 300 and 400 are explained with reference to the watermarking system 102, however, it will be understood that the methods can be implemented in other systems as well.

Referring to method 300 depicting the method of embedding the watermark in the digital media, at block 302, the watermark is converted into a series of bits. At block 304, the digital media is divided into multiple group of the N*N blocks, wherein N may be an odd number.

A set of the watermark bits, for example, a byte or a word of the watermark, is embedded into the blocks of a group based on a LBP synthesis process as described previously. The same set of the watermark bits are inserted in the blocks of a given group. In one example implementation, the set of the watermark bits is inserted in each of the blocks of a given group while in other example implementation; the watermark bits may not be embedded into blocks that have a variance in the predefined threshold range T1-T2 to maintain the imperceptibility of the watermarked digital media.

The LBP synthesis process is carried out, at block 306, to embed a watermark byte in a N*N block. As explained previously, in accordance with one embodiment of the present subject matter, the LBP synthesis process comprises changing values of the neighbor of a central pixel in the N*N block. The value of the neighbor is changed to make the value greater than the value of the central pixel when a bit in the byte of the watermark corresponding to the neighbor is '1' and the value of the neighbor is made lesser than the value of the central pixel when the bit in the byte of the watermark is '0'.

Further, in one implementation, after the LBP synthesis process is carried out, some of the blocks in which the watermark bits are inserted may undergo distortion at their boundaries. At block 308, de-blocking filtration may be performed to remove such distortions from the watermarked digital media.

As explained previously, the entire watermark to be embedded in the digital media is converted into a string of bits and sets of bits from the string of bits are embedded in the digital media group by group such that the N*N blocks in a group have the same set of watermark bits embedded. The process of embedding a set of watermark bits into a given N*N block as explained above is repeated multiple times to insert the entire watermark in the digital media.

Referring now to method 400 depicting the method of extracting a watermark from a watermarked digital media, at block 402, the watermarked digital media is again segregated into multiple groups of N*N blocks. As mentioned previously, the segregation made to extract the watermark is same as that done to embed the watermark in the digital media.

At block 404, the local binary pattern of each of the N*N blocks in a group is computed. The local binary pattern is computed using a forward LBP process as explained previously. At block 406, the local binary pattern that occurs most frequently in the row is determined. In one example, the histogram method as explained previously is used to determine the most frequently occurring local binary pattern. The local binary pattern that occurs most frequently in the row corresponds to the set of watermark bits inserted in the blocks of the group and may be extracted at block 408. Accordingly, the complete watermark may be obtained by extracting watermark bytes from all the groups of the watermarked digital media. The watermark so extracted may be used for various purposes, such as identification and authentication of information of owner of the digital media.

Although embodiments for methods and systems for watermark embedding and extracting from digital media have been described in a language specific to structural features and/or methods, it is to be understood that the invention is not necessarily limited to the specific features or methods described. Rather, the specific features and methods are disclosed as exemplary embodiments for watermark embedding and extracting from digital media.

We claim:

1. A method for embedding a watermark in a digital media, the method comprising:
dividing a portion of digital media into a plurality of groups of N*N blocks based on a number of watermark bits to be accommodated in the plurality of groups of N*N blocks of the digital media, wherein N is an odd number, wherein a group of the plurality of groups of N*N blocks is formed by selecting a set of blocks from amongst rows or columns of the digital media in a predetermined order, and wherein the digital media comprises audio, video, and image;
embedding a set of watermark bits from the number of watermark bits into one or more of the N*N blocks of a group, from amongst the plurality of groups, by a local binary pattern (LBP) synthesis process, wherein the total number of N*N blocks required to embed the set of watermark bits is decided such that an entire row of the number of N*N blocks contain one byte of the watermark, the LBP synthesis process comprising:
changing a value of a neighbor pixel of a central pixel of a N*N block, from amongst the one or more of the N*N blocks, to make the value of the neighbor pixel greater than a value of the central pixel when a watermark bit, from amongst the set of watermark bits, corresponding to the neighbor is '1'; and
changing the value of the neighbor pixel of the central pixel of the N*N block to make the value of the neighbor pixel lesser than the value of the central pixel when the watermark bit corresponding to the neighbor is '0';
determining a variance of each of the one or more of the N*N blocks, wherein the set of watermark bits are embedded only in the blocks whose variance is in a predefined threshold range and determining that value of pixels in the block are far spread out when the variance is high and skip embedding the watermark bits in those blocks whose variance is high, to retain the watermark imperceptible,
wherein the set of watermark bits are embedded in one of only outer contour pixels at periphery of the N*N block and at same radial distance from the central pixel of the N*N block, a combination of inner contours pixels and outer contour pixels of the N*N block, a combination of the outer contour pixels, immediate neighbor of the central pixel in the inner contour pixels of the N*N block;
repeating the LBP synthesis process until all the bits in the set of watermark bits are embedded into the one or more of the N*N blocks; and
applying de-blocking filtration to remove distortion at boundaries of the one or more of the N*N blocks.

2. The method as claimed in claim 1 further comprising converting the watermark into a series of watermark bits comprising the set of watermark bits.

3. The method as claimed in claim 1 further comprising:
determining a first neighbor of the central pixel in the N*N block to correspond to a most significant bit (MSB) position of the set of watermark bits; and
traversing in a predefined order to move to a second neighbor of the central pixel, wherein the second neighbor corresponds a (MSB-1) position of the set of watermark bits.

4. A method for extracting a watermark from a watermarked digital media, the method comprising:
dividing the watermarked digital media into a plurality of groups of N*N blocks, wherein N is an odd number and the watermarked digital media comprises audio, video, and image, wherein each group of the N*N blocks include a set of block from rows and columns of the watermarked digital media, and wherein the entire row of a number of N*N blocks contain one byte of the watermark;
computing a local binary pattern of each of the N*N blocks in a group from amongst the plurality of groups, wherein the local binary pattern is computed by comparing a value of a central pixel to a value of a neighbor pixel, and wherein the value of the neighbor pixel is greater than the value of the central pixel, a bit '1' is assigned, else '0' is assigned to a watermark bit amongst a set of watermark bits, wherein comparison starts from the value of the neighbor pixel corresponds to a most significant bit (MSB) position of the set of watermarked bits and ends with the neighbor pixel corresponds to a least significant bit (LSB) position of the set of watermarked bits, wherein the neighbor pixels are traversed in a predetermined direction chosen during the embedding of the set of watermarked bits;
determining the local binary pattern that occurs most frequently in the group, wherein the local binary pattern that occurs most frequently in the group corresponds to the set of watermark bits inserted in the N*N blocks of the group;
extracting the local binary pattern that occurs most frequently in the group from the watermarked digital media, wherein the extracted local binary pattern is converted into equivalent decimal representation; and
scanning the watermarked digital media group by group to extract the entire watermark embedded in the watermarked digital media.

5. The method as claimed in claim 4, wherein the dividing is same as done for embedding the set of watermark bits in the watermarked digital media.

6. The method as claimed in claim 4, wherein the determining comprises making a histogram mapping the local binary pattern of the N*N blocks in the group against a number of times of occurrence of the local binary pattern.

7. A watermarking system comprising:
a processor;
a memory coupled to the processor, the memory configured to cause the processor to:
convert a watermark to be embedded to a digital media into a string of bits;
divide the digital media into a plurality of groups of N*N blocks based on a number of watermark bits to be accommodated in the plurality of groups of N*N blocks of the digital media, wherein N is an odd number, wherein a group of the plurality of groups of N*N blocks is formed by selecting a set of blocks from amongst rows or columns of the digital media in a predetermined order, and wherein the digital media comprises audio, video, and image;
insert a set of bits of the watermark from the number of watermark bits, from amongst the string of bits, into one or more N*N blocks in a group of N*N blocks, from amongst the plurality groups, wherein the total number of N*N blocks required to embed the set of watermark bits is decided such that an entire row of the number of N*N blocks contains one byte of the watermark, wherein the LBP synthesis process includes:
changing a value of a neighbor pixel of a central pixel of a N*N block to make the value of the neighbor pixel greater than a value of the central pixel when a watermark bit in the set of bits corresponding to the neighbor is '1';

changing the value of the neighbor pixel of the central pixel of the N*N block to make the value of the neighbor pixel lesser than the value of the central pixel, when the watermark bit in the set of bits corresponding to the neighbor is '0'; and determining a variance of each of the one or more of the N*N blocks wherein the set of watermark bits are embedded only in the blocks whose variance is in a predefined threshold range and determining that value of pixels in the block are far spread out when the variance is high and skip embedding the watermark bits in those blocks whose variance is high, to retain the watermark imperceptible, wherein the set of watermark bits are embedded in one of only outer contour pixels at periphery of the N*N block and at same radial distance from the central pixel of the N*N block, a combination of inner contours pixels and outer contour pixels of the N*N block, a combination of the outer contour pixels, immediate neighbor of the central pixel in the inner contour pixels of the N*N block;

repeat LBP synthesis process until all the bits in the set of watermark bits are embedded into the one or more of the N*N blocks; and remove distortions occurring at the boundaries of each of the one or more N*N blocks.

8. The watermarking system as claimed in claim 7, wherein the memory is configured to cause the processor to:

compute a local binary pattern of each of the N*N blocks in a group from amongst the plurality of groups wherein the local binary pattern is computed by comparing a value of a central pixel to a value of a neighbor pixel, and wherein the value of the neighbor pixel is greater than the value of the central pixel, a bit '1' is assigned, else '0' is assigned to a watermark bit amongst a set of watermark bits, wherein comparison starts from the value of the neighbor pixel corresponds to a most significant bit (MSB) position of the set of watermarked bits and ends with the neighbor pixel corresponds to a least significant bit (LSB) position of the set of watermarked bits, wherein the neighbor pixels are traversed in a predetermined direction chosen during the embedding of the set of watermarked bits;

determine a local binary pattern that occurs most frequently in the group, wherein the local binary pattern that occurs most frequently in the group corresponds to the set of watermark bits inserted in the N*N blocks of the group;

extract the local binary pattern that occurs most frequently in the group, wherein the extracted local binary pattern is converted into equivalent decimal representation; and scan the watermarked digital media group by group to extract the entire watermark embedded in the watermarked digital media.

* * * * *